United States Patent [19]

Westernacher et al.

[11] 4,205,045
[45] May 27, 1980

[54] RADIAL-FLOW REACTOR WITH HEATABLE CATALYST FILLING

[75] Inventors: Helmut Westernacher, Haltern; Peter Schimpff; Ferdinand Botthof, both of Marl, all of Fed. Rep. of Germany

[73] Assignee: Chemische Werke Huls Aktiengesellschaft, Fed. Rep. of Germany

[21] Appl. No.: 888,746

[22] Filed: Mar. 21, 1978

[30] Foreign Application Priority Data

Mar. 22, 1977 [DE] Fed. Rep. of Germany ....... 2712371

[51] Int. Cl.² .............................................. B01J 8/02
[52] U.S. Cl. ...................................... 422/192; 13/25;
422/193; 422/199; 422/218
[58] Field of Search .............. 23/288 R, 288 L, 288 J,
23/288 K, 289; 13/25 (U.S. only); 422/192,
199, 218, 193

[56] References Cited

U.S. PATENT DOCUMENTS

| 2,280,081 | 4/1942 | Prickett et al. | 23/288 L |
| 2,291,762 | 8/1942 | Samans | 23/288 L |
| 3,375,319 | 3/1968 | Beck | 13/25 |
| 3,497,674 | 2/1970 | Zirngibl et al. | 23/288 R |
| 3,507,628 | 4/1970 | Berthoud et al. | 23/288 R |
| 3,538,231 | 11/1970 | Newkirk et al. | 13/25 |
| 3,685,310 | 8/1972 | Fischer | 23/288 J UX |
| 3,796,207 | 3/1974 | Olson | 23/288 J X |
| 3,954,422 | 5/1976 | Mentschel | 23/288 R X |

Primary Examiner—Joseph Scovronek
Attorney, Agent, or Firm—Craig and Antonelli

[57] ABSTRACT

A radial-flow reactor, especially for carrying out endothermic, catalytic reactions, which has a closed reactor housing defining a reactor chamber therein, a centrally arranged, first inlet duct for entry of a gaseous reactant stream and a catalyst bed disposed around the duct located within said chamber, and at least one additional outlet duct arranged on the outer rim of the housing for discharge of a gaseous product stream from said reactor chamber. A plurality of heating elements are embedded in the catalyst bed. Each heating element is constructed as a straight heating tube and each tube has one free end projecting into the reactor chamber, with a part adjacent to the other end attached to a base plate. The base plate forms a part of a wall structure defining the reactor chamber within said housing and can be detached from the wall structure. A group of the heating elements is secured to one base plate so that the group of elements and the one base plate can be removed from the reactor together.

13 Claims, 5 Drawing Figures

FIG. I.

RADIAL-FLOW REACTOR WITH HEATABLE CATALYST FILLING

This invention relates to a radial-flow reactor, especially for the conductance of endothermic, catalytic reactions, with a centrally arranged, first passage or duct and a catalyst bed disposed around the duct, preferably consisting of a pourable catalyst, and with at least one further passage or duct arranged on the outer rim of the catalyst bed.

DAS [German Published Application] 1,593,372 proposes to conduct the catalytic dehydrogenation of, inter alia, alkylated aromatic hydrocarbons to vinyl-substituted aromatic hydrocarbons in a radial-flow reactor. The heat required for the reaction is fed to the radial-flow reactor by means of superheated steam, wherein steam and, for example, ethylbenzene, are introduced in a ratio of 2:1. This type of energy supply, however, is frequently found to be too inaccurate in the feeding quantities and also too uneconomical, because, on the one hand, the steam transmits its energy in the reactor preferably locally and, on the other hand, the energy is supplied in such quantities that the starting material is partially thermally decomposed and thus is lost to the process.

Accordingly, there is the problem of improving the metered feeding of thermal energy in radial-flow reactors and of distributing such energy more advantageously over the reactor volume or the catalyst volume. This problem is solved, in accordance with the invention, in a partial aspect thereof, by embedding heating elements in the reactor bed.

Such a feature of embedding heating elements is known per se in connection with tubular reactors (see, for example, DOS [German Unexamined Laid-Open Application] 1,418,975). This DOS suggests to supply thermal energy to the catalyst by indirect heat transfer media. The suggestion is made, instead of the conventional steps including the introduction of additional steam after the reactor inlet, to add the required amounts of heat indirectly by the provision of devices, such as coils, in the catalyst bed. The last-mentioned DOS does not contain any exact constructional details.

Consequently, the state of the art does not contain any disclosure teaching how the heating elements are to be arranged and to be constructed in case of a radial-flow reactor. There is a proposal in the literature *Ullmanns Enzyklopaedie der Technischen Chemie [Ullmann's Encyclopedia of Technical Chemistry]* 3:471 [1973]) to install the heating elements in the usual manner in interspaces between individual sections of catalyst beds. Another proposal is to place the heat-exchange tubes directly in the catalyst, but the disadvantage is noted, in this connection, that the arrangement can only be utilized where the catalyst needs to be changed only rarely, since the tubes interfere with the catalyst changing operation.

Thus, there is the problem, as seen in total, to provide heatable radial-flow reactors wherein the catalyst and the heating elements, both of which are prone to wear and tear, are to be readily exchangeable without having to construct the reactor so that it deviates substantially from the well-proven structural principles. Furthermore, there is the objective of expanding the possibilities for controlling the heating process by providing that individual sections of the catalyst bed can be operated at differing temperatures. The necessity for a careful temperature control is also brought out, for example, in DOS 1,418,975, mentioned hereinabove.

Besides, the novel reactor is to have the capability of being traversed in the horizontal as well as vertical directions. In summation: it is to be possible by means of the novel reactor of this invention to introduce heat in a simple manner, wherein the construction is to offer the advantage, at the same time, of being able to exchange the catalyst in a way requiring a minimum amount of work.

This objective is attained in a radial-flow reactor of this invention wherein heating elements are embedded in the catalyst bed, these elements being fashioned as straight heating tubes or rods projecting with one free end into a reactor chamber containing the catalyst bed and being attached with their other ends to base plates, wherein the base plates constitute parts of a wall of the reactor chamber.

It is possible with such heating elements, wherein the base plates are joined to the body or frame structure of the reactor, preferably in a detachable fashion, for example by screws, to effect the exchange, i.e. replacement, of the heating tubes and of the catalyst charge in a simple manner. The base plates can be arranged on the sidewalls, but preferably are disposed on the floor of a cylindrical radial-flow reactor. The flow of the product stream should be effected at right angles to the heating tubes. The arrangement of the straight heating tubes on a base plate detachably joined to the reactor structure permits, during an exchange of the catalyst, a simple, rapid, and economical removal of the consumed catalyst mass by pulling out the bundle of heating tubes connected to the base plate. For this purpose, the base plate is detached on the underside from the reactor structure, lowered with the aid of the fork of a forklift truck, and the catalyst material can thus fall out or flows out from between the heating rod bundles simply by turning the plate.

In this connection, the special suggestion is advanced to place the reactor with one plane side on a supporting framework and to provide the reactor at its underside with the detachable base plates which are located above an insulating layer that may be present and which are joined to the reactor structure, for example, by a welding seam or seams.

Preferably, the heating elements will consist essentially of cylindrical ceramic tubes in which are inserted conventional, electrically heatable metal coils. To provide protection against corrosion and mechanical wear, it is suggested to surround the ceramic tube of the heating element with a smooth or corrugated metal sleeve.

The electrical heating feature makes it possible to effect a control of the heating power and the heat distribution within the heating tube bundles in a simple manner. In this connection, it is suggested to combine in each case one or more bundles having a predetermined number of heating elements into sections, each of which can be supplied with a certain, controlled amount of thermal energy. The heating elements are electrically combined into subgroups and main groups; the energy supply can be controlled as required either separately and/or for all groups together. It is possible in this way to set any desired temperature profile within the reactor. In this connection, the special suggestion is made to arrange the individual sections, in case of a cylindrical reactor, concentrically around the central inlet passage or duct and thereby to form individual, annular zones which can be heated separately.

Embodiments of the invention will be described with reference to the drawings to explain the apparatus of this invention and additional details pertaining thereto, wherein:

FIG. 1 schematically shows a reactor according to the invention in a partial cross-sectional view and in a partial lateral view along different parting planes;

Figure 1:
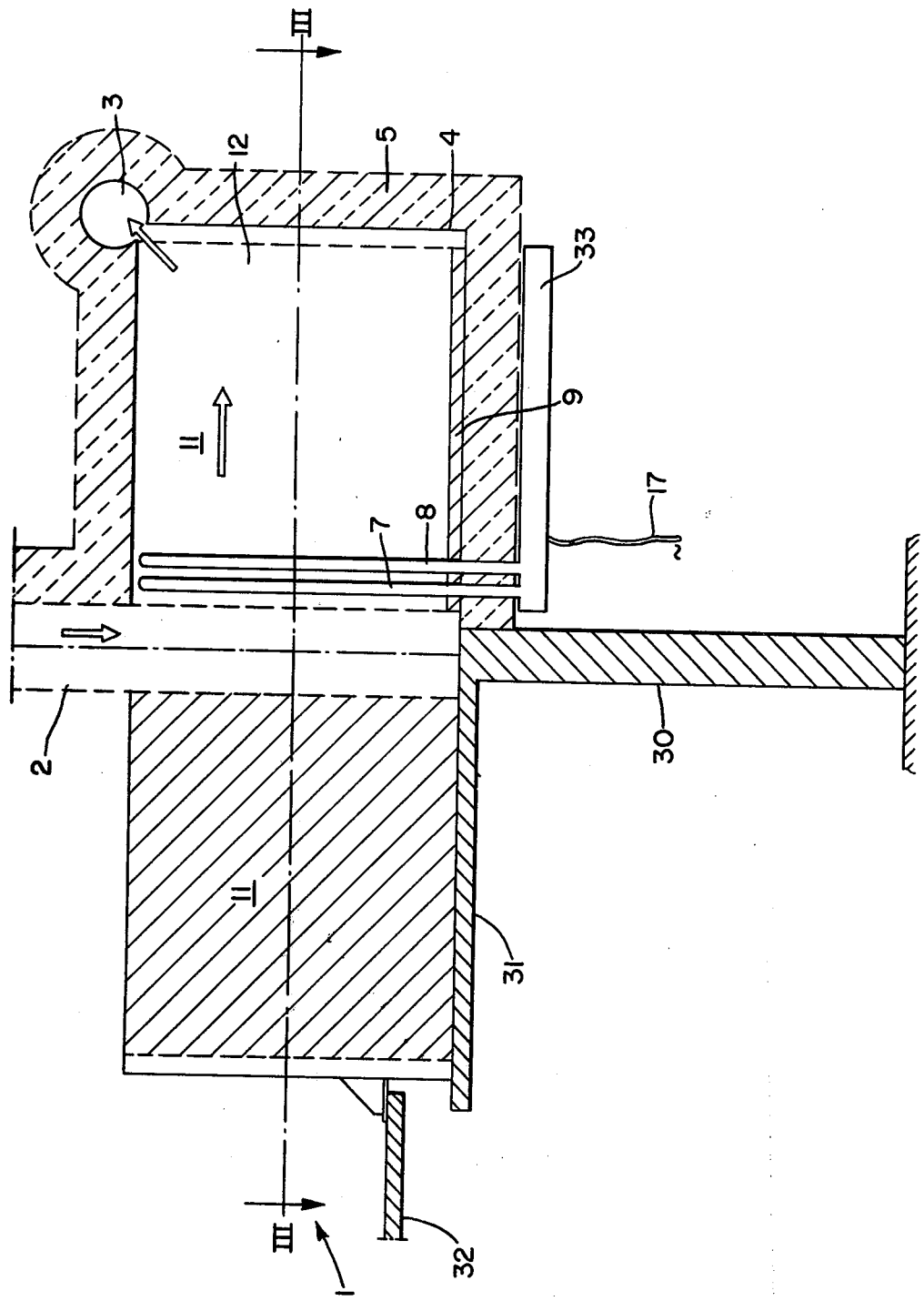

FIG. 1 shows a radial-flow reactor, indicated generally at 1, in a schematic view. The reactor, in principle, has a cylindrical structure. It is, of course, also possible to provide a different design for the reactor, for example, an elliptical or quadrangular configuration. The reactor is set up vertically on a framework 30 spreading out into a supporting surface consisting of beams 31 arranged in a star-shaped design. The beams 31 can be supported by further stabilizing vertical beams, but it is also possible to provide straps on a reactor wall of the reactor structure by means of which the reactor can be inserted in a supporting construction 32 that surrounds the reactor.

The reactant stream is introduced through a centrally arranged, first inlet passage or duct 2 and, after the reaction within the chamber 11, the gas is discharged to the outside through a collective ring-shaped, i.e. annular passage, or duct 3. The reactor comprises an external pressure reactor housing 4 made of an appropriate nickel-steel alloy. As indicated in FIG. 1, an insulating layer 5 is additionally placed around the reactor, taking care of thermal insulation.

Figure 3:
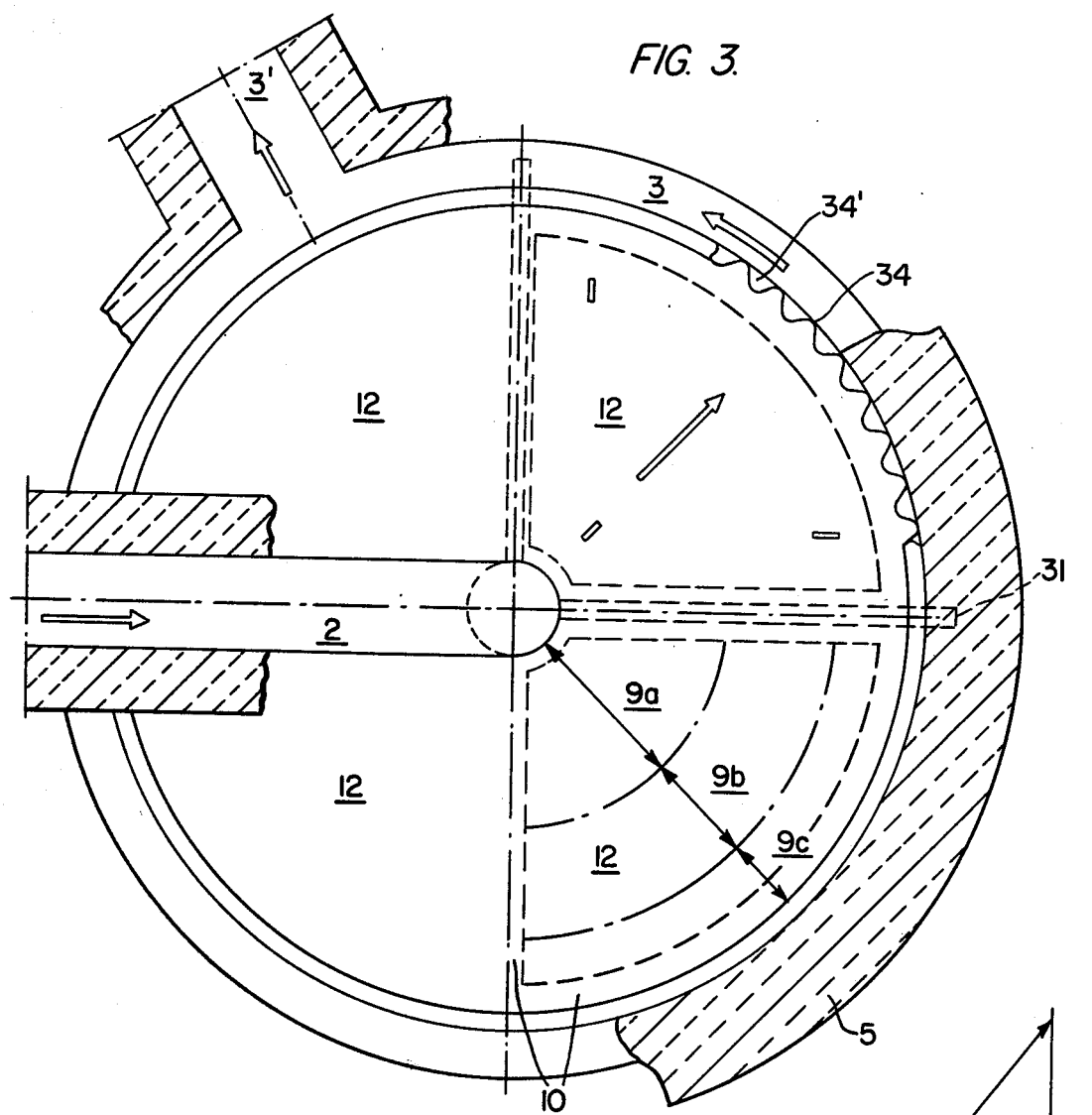
FIG. 3 shows a top view along a sectional plane according to line III—III in FIG. 1.

A portion of the bottom of the reactor is formed from a plurality of separable base plates 9 studded with numerous heating rods 7, 8, extending in the upward direction vertically from each base plate 9. The plates 9 are located above an insulating layer 5 and in parallel to the bottom side of the reactor 1. The reactor chamber 11 is filled with a pourable, particulate, catalyst material. Suitable catalyst materials are, in particular, especially prepared, self-regenerating catalysts having an iron oxide basis, for example, Shell Catalyst 105 (composition: approximately 85% $Fe_2O_3$, 2% $Cr_2O_3$, 12% KOH, 1% NaOH). The plates, as shown in FIG. 3, are secured to each other and to a base plate supporting means 10 in a gas-tight manner to provide a continuous floor surface for supporting the pourable, particulate, catalyst material.

Figure 2:
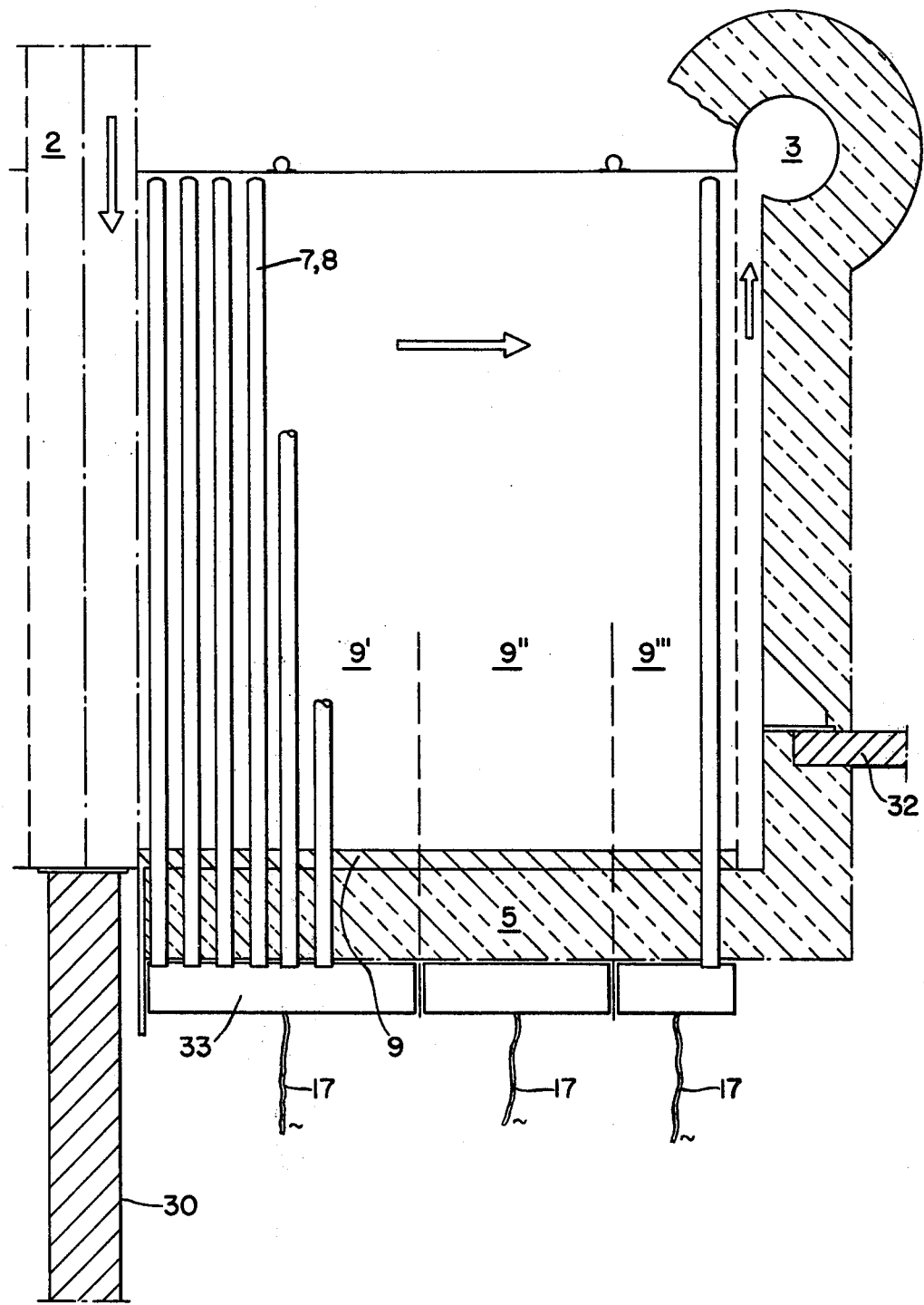
FIG. 2 shows further details of the structure of the reactor housing.

After consumption of the catalyst material, the catalyst material must be discharged, i.e. removed from the reactor chamber. Such a discharge is substantially facilitated by providing that each base plate 9, arranged in the zone of the underside of the reactor chamber, is detachably joined to the reacting housing. As indicated in FIG. 2, it is merely necessary to remove a base plate, together with the insulation, in the downward direction for this purpose. This is facilitated, for example, by providing a screw connection or by the presence of only one or two welding seams which must be severed to allow removal of a base plate.

FIG. 2 furthermore shows that electrical junction boxes 33 are arranged underneath the base plates and the lower insulating layer. These junction boxes are adapted in their contour, i.e. configuration, to the associated base plates. The boxes are supplied with energy via individual current leads 17. Each of the individual junction boxes 33 can thus be actuated separately. Therefore, several heating zones (9', 9'', 9''') can be established by means of the junction boxes, which can be heated to different temperatures via a central control means (not shown).

Figure 5:
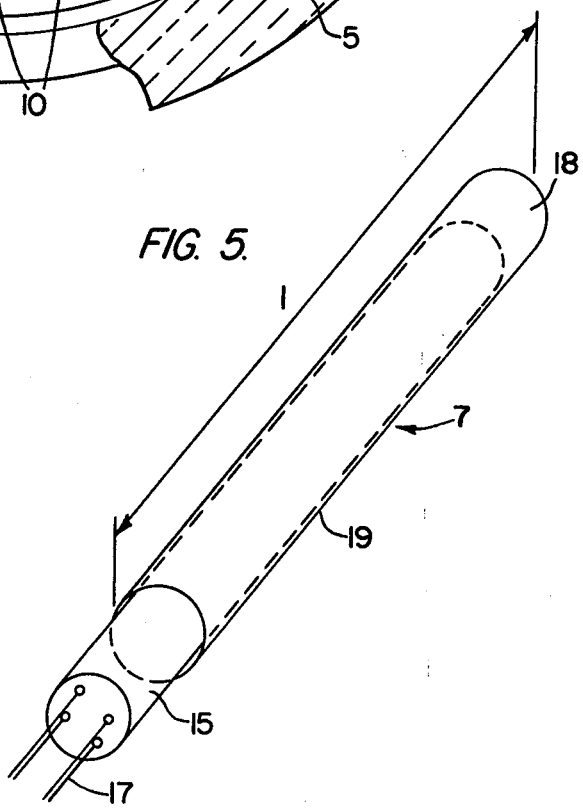
FIG. 5 shows a perspective view of a heating element.

The heating elements are heating tubes as illustrated in FIG. 5. The elements each consist of a massive, cylindrical ceramic tube 15 in which are inserted conventional, electrically heatable units, such as metal coils and/or electric conductors protected by additional ceramic pipes (not shown). The electrical terminals 17 can be seen at the outlet points. The ceramic tube can be sealed at one or each of its free end faces 18 with ceramic endpieces. A suitable material for such tubes is, for example, a ceramic substance commercially available under the name of "Pythagoras". To protect the ceramic tube against corrosive and abrasive influences, the tube is furthermore surrounded by a metal sleeve 19 made of appropriate corrosion-resistant metal.

FIG. 3 shows the inlet in the center of the reactor vessel, in the shape of a perforated pipe, namely the feed passage or duct 2. The individual base plates in each floor section 12 have, for example, the shape of annular sectors 9a, 9b, 9c. From the feed duct 2, the product gas passes through the catalyst bed from the inside toward the outside initially up to a perforated partition 34 made of corrugated sheet metal and through the passages 34' formed by the corrugations to a collecting conduit 3 arranged at the upper rim of the reactor vessel. From there, the product gas passes via the outlet duct 3' into a collector or the like. The wall of the reactor housing is formed laterally by a steel jacket surrounded from the outside by an insulating layer.

Figure 4:
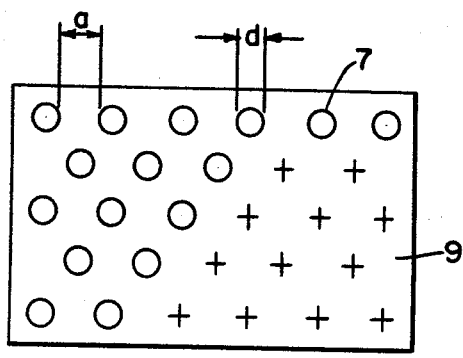
FIG. 4 shows the arrangement of the heating elements on a base plate.

The heating tubes are arranged so that 25–500, preferably 100–200, heating tubes are installed per square meter of unit area of the base plates. The heating tubes have a length l of 0.5–5 m., preferably 1–3 m. Their diameter d is 1–8 cm., preferably 3–5 cm. The wall thickness of the tubes is 2–3 mm. The tubes project from the base plate to such an extent that the terminals can extend past the insulating layer 5 in the downward direction. The heating tubes, as shown in FIG. 4, are mounted at a spacing a from each other of 2–20 cm. (preferably 5–10 cm.), measured in each case from one outer side to the other. The base plates, provided with heating tubes, are introduced into the bottom of the reactor vessel through appropriate cutouts and, if desired, are sealingly welded to the remaining floor structure.

By arranging the heating rods in various groups, it is possible to establish a specific temperature profile within the reaction zones filled with catalyst material. The base plates are made of heat resisting steel. The heating tubes are secured to the base plate, e.g., by screw means or by flange means. The base plates are secured into the floor portion of the reactor housing by welding or by screw means. The base plates (9a, 9b, 9c), insulation material, heating tubes and the electrical junction box can be removed as a unit.

What is claimed is:

1. A radial-flow reactor for effecting endothermic, catalytic reactions, which comprises a closed reactor housing, having a reactor chamber therein, a centrally arranged, inlet duct for introducing gaseous reactants radially into said reactor chamber, a catalyst bed disposed around the inlet duct and located within said chamber, and at least one outlet duct arranged on an outer rim of the housing containing the catalyst bed, for removing gaseous material from said reactor chamber, a plurality of heating elements embedded in the catalyst bed, said heating elements being constructed as straight electrically heated heating tubes each projecting with one free end into the reactor chamber and being attached with the other end to a base plate, a plurality of base plates forming part of a wall structure defining the reactor chamber and forming said reactor housing, said base plates being joined to the wall structure of the reactor housing in a detachable fashion.

2. The reactor according to claim 1, wherein said reactor housing has a cylindrical shape, the base plates are attached to a planar wall portion of the cylindrically shaped reactor housing and said outlet duct includes an annular passage that surrounds said catalytic bed and that extends from a bottom planar wall to a top planar wall of said reactor housing.

3. The reactor according to claim 1, wherein the reactor is placed, with one wall portion defining a planar floor, on a supporting framework and the detachable base plates are arranged on the floor of the reactor housing.

4. The reactor according to claim 1, wherein the base plates have, per square meter of unit area, 25–500 heating tubes secured thereto.

5. The reactor according to claim 1, wherein the heating tubes have, on the average, a diameter of 1–8 cm. and are arranged at a spacing of 2–20 cm. from each other on a base plate.

6. The reactor according to claim 1, wherein the heating elements consist essentially of cylindrical ceramic tubes in which are inserted electrically heatable metal coils.

7. The reactor according to claim 6, wherein the ceramic tube of the heating element is surrounded by a metal sleeve.

8. The reactor according to claim 1, wherein a predetermined number of said heating elements are combined into sections, each of the sections being controllably supplied with a specific electrical input to provide a controlled amount of heat to each section.

9. The reactor according to claim 8, wherein the reactor housing is shaped as a cylindrical reactor, and the individual sections of heating elements in the cylindrical reactor, are arranged concentrically around the inlet duct and provide annular, separately heatable zones throughout the catalyst bed.

10. The reactor according to claim 1 wherein one of said base plates also forms a closure member for said reactor housing, whereby removal of said one of said base plates provides an opening for discharging said catalytic bed from said reactor chamber.

11. A radial-flow reactor for carrying out catalytic reactions which comprises a reactor housing defining a reactor chamber therein, inlet means for passing a gaseous reactant stream radially into said reactor chamber and outlet means for discharging the gaseous reactant stream out of said reactor chamber, a catalytic bed of particulate catalyst material located within said chamber through which said gaseous reactant stream flows radially from the inlet means to the outlet means and a plurality of heating elements placed within said catalytic bed, each of said heating elements comprising a linear electrically heated heating tube, a group of said heating elements being arranged parallel to each other, with each element of the group projecting with one free end into the catalytic bed and being attached adjacent to the other end to a base plate, said base plate forming a portion of a wall structure defining the reactor chamber provided within said housing and each base plate being detachably secured to the wall structure whereby the base plate and the associated group of heating elements can be removed from said reactor chamber.

12. The reactor according to claim 11, wherein said inlet means includes an inlet duct located centrally within said reactor chamber and said outlet means comprises an annular passage located along an exterior wall of said reactor housing whereby said gaseous reactant stream is caused to pass through said catalytic bed transversely to each of said heating elements.

13. The reactor according to claim 11 wherein said base plate also forms a closure member for said reactor housing whereby an opening is formed in said housing for discharging of said catalytic bed upon removal of said base plate.

* * * * *